US009800697B2

(12) United States Patent
Zuk et al.

(10) Patent No.: US 9,800,697 B2
(45) Date of Patent: *Oct. 24, 2017

(54) L2/L3 MULTI-MODE SWITCH INCLUDING POLICY PROCESSING

(71) Applicant: Palo Alto Networks, Inc., Santa Clara, CA (US)

(72) Inventors: Nir Zuk, Menlo Park, CA (US); Yuming Mao, Saratoga, CA (US); Haoying Xu, San Jose, CA (US); Arnit Green, Redwood City, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 88 days.

This patent is subject to a terminal disclaimer.

(21) Appl. No.: 15/000,348

(22) Filed: Jan. 19, 2016

(65) Prior Publication Data
US 2016/0219131 A1 Jul. 28, 2016

Related U.S. Application Data

(63) Continuation of application No. 14/062,702, filed on Oct. 24, 2013, now Pat. No. 9,294,394, which is a
(Continued)

(51) Int. Cl.
H04L 12/28 (2006.01)
H04L 29/06 (2006.01)
H04L 12/715 (2013.01)
H04L 12/725 (2013.01)
H04L 12/741 (2013.01)
H04L 12/771 (2013.01)
H04L 12/773 (2013.01)
H04L 12/721 (2013.01)

(52) U.S. Cl.
CPC .............. *H04L 69/22* (2013.01); *H04L 45/04* (2013.01); *H04L 45/308* (2013.01); *H04L 45/54* (2013.01); *H04L 45/56* (2013.01); *H04L 45/60* (2013.01); *H04L 45/66* (2013.01); *H04L 45/745* (2013.01)

(58) Field of Classification Search
CPC ....... H04L 45/04; H04L 45/308; H04L 45/54; H04L 45/745; H04L 45/60; H04L 45/66; H04L 69/22; H04L 45/56
See application file for complete search history.

(56) References Cited

U.S. PATENT DOCUMENTS 8,594,085 B2 * 11/2013 Zuk .................. H04L 45/04
370/230
8,769,664 B1 * 7/2014 Zuk .................. H04L 63/02
713/151

(Continued)

Primary Examiner — Ayaz Sheikh
Assistant Examiner — Hai-Chang Hsiung
(74) Attorney, Agent, or Firm — Van Pelt, Yi & James LLP

(57) ABSTRACT

Methods and apparatus for processing data packets in a computer network are described. One general method includes receiving a data packet; examining the data packet to classify the data packet including classifying the data packet as a L2 or L3 packet and including determining at least one zone associated with the packet; processing the packet in accordance with one or more policies associated with the zone; determining forwarding information associated with the data packet; and if one or more policies permit, forwarding the data packet toward an intended destination using the forwarding information.

20 Claims, 4 Drawing Sheets

Related U.S. Application Data continuation of application No. 11/734,198, filed on Apr. 11, 2007, now Pat. No. 8,594,085.

(56) References Cited

U.S. PATENT DOCUMENTS

| | | | |
|---|---|---|---|
| 2002/0016856 A1* | 2/2002 | Tallegas | H04L 45/00 709/238 |
| 2003/0067874 A1* | 4/2003 | See | H04L 12/4625 370/230.1 |
| 2006/0056297 A1* | 3/2006 | Bryson | H04L 63/104 370/230 |

* cited by examiner

L2/L3 MULTI-MODE SWITCH INCLUDING POLICY PROCESSING

CROSS REFERENCE TO OTHER APPLICATIONS

This application is a continuation of U.S. patent application Ser. No. 14/062,702, entitled L2/L3 MULTI-MODE SWITCH INCLUDING POLICY PROCESSING, filed Oct. 24, 2013, which is a continuation of U.S. patent application Ser. No. 11/734,198, now U.S. Pat. No. 8,594,085, entitled L2/L3 MULTI-MODE SWITCH INCLUDING POLICY PROCESSING, filed Apr. 11, 2007, both of which are incorporated herein by reference for all purposes.

BACKGROUND

The present invention relates to methods and apparatus for controlling computer network security.

A conventional switch is a multiport network device that can be used to connect elements of a communication network. Fundamentally, the switch operates to provide routing services for transporting packets through the switch on toward a destination.

A Layer 2 switch provides Ethernet frame forwarding based completely on a media access control (MAC) addresses contained in each frame and associated with the destination. Accordingly, a conventional Layer 2 switch will provide packet forwarding if the switch knows the destination's location (or based on assumptions of a destination's location). A conventional Layer 2 switch may be programmed with such information or learn dynamically. A MAC table (or L2 Forwarding Table) is the repository of the learned information, allowing for routing decisions to be made based on the destination MAC address to a proper port of the device.

In addition to switching, Layer 2 switches can perform access control using, for example, access control lists (ACLs). ACLs can be used to identify frames according to their MAC addresses, VLAN IDs, protocol types (for non-IP frames), IP addresses, protocols, and Layer 4 port numbers. ACLs can be used to stop the forwarding process.

As a final matter, Layer 2 switches can include other control lists that can be used to control quality of service (QoS). QoS ACLs can be used to classify incoming frames according to quality of service (QoS) parameters, to police or control the rate of traffic flows, and to mark QoS parameters in outbound frames.

A multilayer switch (or one that conforms to the multilayer switching (MLS) protocol) can be used to perform switching at different levels, using two different types of information as a basis for forwarding decisions. One example is a Layer 2/Layer3 (L2/L3) switch. In a conventional L2/L3 switch, each packet is pulled off an ingress queue and inspected for both Layer 2 and Layer 3 destination addresses. The decision where to forward the packet is based on two address tables (an L2 forwarding table and a L3 forwarding table). How or whether to forward the packet is still based on access control list results. For the L2 forwarding decision, the destination MAC address is used as an index to the L2 forwarding table. If the frame contains a Layer 3 packet to be forwarded, the destination MAC address is that of a Layer 3 port on the switch. Similarly, the L3 forwarding table is consulted, using the destination IP address as an index. The longest match in the table is found (both address and mask), and the resulting next-hop Layer 3 address is obtained. The L3 forwarding table can also contain each next-hop entry's Layer 2 MAC address and the egress switch port (and VLAN ID), so that further table lookups are not necessary.

SUMMARY

The present invention provides methods and apparatus, including computer program products, for classifying data packets and for implementing computer network security.

In one aspect a method includes receiving a data packet, examining the data packet to determine if the packet is a layer 2 or layer 3 packet for forwarding purposes, determining a zone associated with the packet and a security policy (e.g., based on one of the target or source destination), starting a session based on the policy determination and forwarding the packet in accordance with the look-up information. Subsequent packets are then processed in accordance with the security policy, session information and L2/L3 forwarding tables.

In another aspect a method for forwarding data packets in a computer network includes receiving a data packet; examining the data packet to classify the data packet including classifying the data packet as a L2 or L3 packet and including determining at least one zone associated with the packet; processing the packet in accordance with one or more policies associated with the zone; determining forwarding information associated with the data packet; and if one or more policies permit, forwarding the data packet toward an intended destination using the forwarding information.

Aspects of the invention can include none, one or more of the following features. Determining a zone can include determining a destination zone associated with the data packet. Determining a zone can include determining a source zone associated with the data packet. Processing the packet can include classifying the packet in accordance header data. Processing the packet can include classifying the packet in accordance with signature data. Processing the data packet can include classifying the packet based on the content. Processing the packet can include content based protocol decoding. Processing the packet can include content based object extraction. Processing the packet can include content based pattern matching. Processing the packet can be selected from the group consisting of logging, storing, allowing the packet to pass, setting an alarm, blocking, or dropping the packet.

In another aspect a device is provided that can include a multi-mode switch for classifying received data packets as L2 or L3 packets and determining a zone associated with received packets. The device includes an L2 routing table for use in determining a L2 forwarding definition, an L3 routing table for use in determining a L3 routing definition, a policy engine for determining one or more policies associated with received packets based on a zone, a policy set; and a processing engine for processing the received packets in accordance with any associated policies and forwarding received packets in accordance with L2/L3 forwarding/routing definitions.

Aspects of the invention can include none, one or more of the following features. The device can include a session engine for determining a session associated with a packet flow. The multi-mode switch can be operable to determine a destination zone associated with a received packet. The multi-mode switch can be operable to determine a source zone associated with a received packet. The device can include a plurality of ingress ports, egress ports and a switch fabric.

The details of one or more implementations of the invention are set forth in the accompanying drawings and the description below. Other features and advantages of the invention will become apparent from the description, the drawings, and the claims.

DESCRIPTION OF DRAWINGS

FIG. 2b illustrates a detailed block diagram of a processing engine of the multi-mode switch of FIG. 2a.

Like reference numbers and designations in the various drawings indicate like elements.

DETAILED DESCRIPTION

Proposed are systems, apparatus, methods, computer program products and the like for a method for forwarding data packets in a computer network. One example method includes receiving a data packet for forwarding. The data packet is examined to classify the data packet including classifying the data packet as a L2 or L3 packet. The classification includes determining a zone associated with the packet. The zone determination can include only the determination of a destination zone or source zone, or alternatively both can be determined. The data packet is processed in accordance with one or more policies associated with the determined zone(s). Processing can include numerous operations including allowing the packet, dropping the packet, setting an alarm, logging the packet, other actions or combinations of these. Subsequent look-ups are performed including determining forwarding information associated with the data packet, using for example L2 forwarding and L3 routing tables. If the one or more policies permit, the data packet can be forwarded toward an intended destination using the forwarding information.

Figure 1:
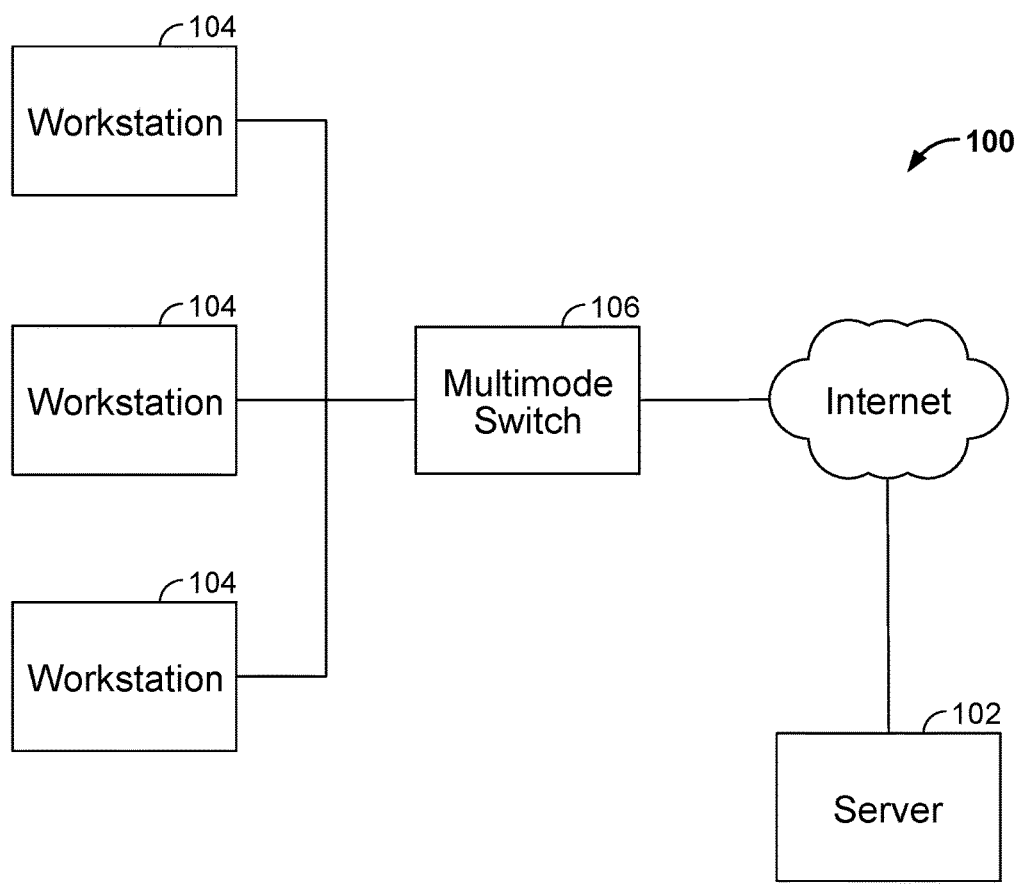
FIG. 1 shows a block diagram of a network topology that includes a multi-mode switch.

FIG. 1 shows a simple network topology including a local area network (LAN) 100, a server 102, several workstations (W/S) 104, and a multi-mode switching security device (hereinafter simple referred to here as "multi-mode switch") 106. The network topology is merely representative of one implementation for the use of multi-mode switch 106. Other network topologies are possible including those that include more than one network, wide area network(s), local area networks or combinations of both with or without distributed topologies (e.g., topologies other than client-server topologies).

Figure 2A:
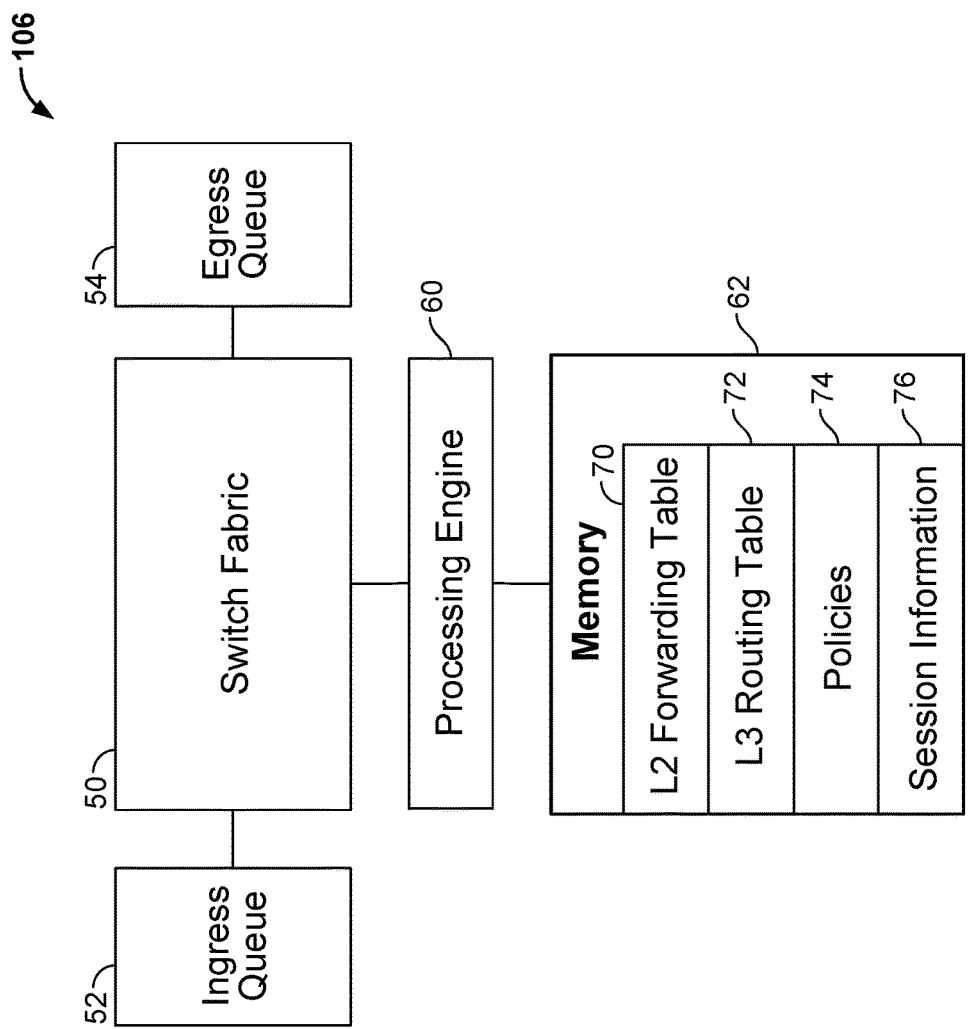
FIG. 2a illustrates a block diagram of a multi-mode switch.

Referring now to FIG. 2a, the multi-mode switch 106 includes switch fabric 50 coupled between ingress and egress queues 52, 54. Ingress queues and egress queues 52, 54 are coupled to ports of the multi-mode switch 106. Multi-mode switch 106 includes a processing engine 60 that is coupled to one or more memory elements 62 for processing received packets. Processing engine 60 can be of the form of hardware or software of combinations of both. Further, though a single processing engine is shown, plural processing engines can be included each performing separate parts of the processes described below. Alternatively, a plurality of similar processing engines can be included that are programmed or configured to execute similar operations. The configuration shown should not be construed as limiting.

Memory 62 can include content addressable memory and contain indexes that are used to determine forwarding instructions. Memory 62 includes a L2 forwarding table 70, a L3 routing table 72, policies 74, and session information 76. L2 forwarding table 70 includes forwarding information that is indexed by a MAC destination address. L3 routing table includes forwarding information that is indexed by a destination internet protocol address. Policies 74 include policy rules that are indexed by zone, either destination or source zone. Session information 76 includes flow instructions associated with a session that has been previously characterized and processed by the processing engine 60. Policies and sessions are described in greater detail below.

The computer workstations, servers and other devices in the LAN are interconnected using a number of data transmission media such as wire, fiber optics, and radio waves. The multi-mode switch 106 forwards packets through the network as well as monitors packets being communicated within the network to facilitate the blocking of packets associated with an attempted network security intrusion.

Figure 2B:
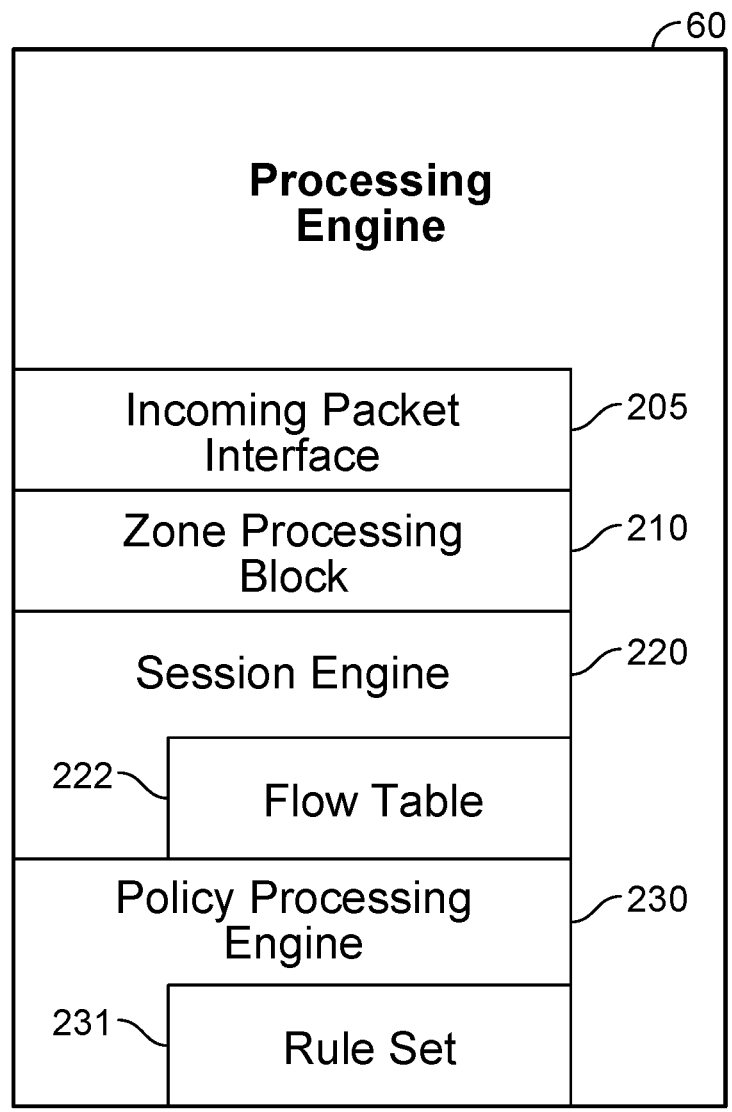

FIG. 2b shows a block diagram of processing engine 60. In one implementation, processing engine 60 includes an incoming packet interface 205, zone processing block 210, session engine 220, and policy processing engine 230.

Processing engine 60 includes an incoming packet interface 205 for receiving packets from the various ingress queues 52. Which queues provide packets and in which order can be controlled by a separate queue management engine (not shown) in accordance with various QoS parameters. The received packets are analyzed by a zone classification block 210 to determine what zone (one or both of a destination and source zone) is/are associated with the given packet. Based on the zone classification, one or more policies can be applied to the processing of the packet.

Session engine 220 can be used to allow for the quick processing of packets that have already been classified. Session engine 220 can initially be used to create a session associated with a particular packet flow (e.g., a session associated with a particular flow that has a given destination zone). Thereafter, the session engine 220 can be used to speed the decision process for handling subsequent packets for a same flow.

The session engine 220 also includes a flow table 222. The flow table 222 is used to store information regarding flows associated with received packets. Associated with a flow can be one or more rules stored or indicated in the flow table 222. The rules can be used to further process packets associated with a given flow. The flow table 222 includes flow records associated with current TCP/IP flows. A TCP/IP flow includes a sequence of data packets communicating information between a source and a destination in one direction. The flow records can be indexed using an indexing key. The indexing key can be used to store and retrieve the appropriate flow record associated with a received packet. In one implementation, the indexing key can be a hash key and the flow table 222 can be implemented as a hash table. The flow table 222 stores instructions that can be used by one or more modules in the multi-mode switch 106 to further process received packets. The flow record can include flow information. Flow information can be of the form of policy information (firewall policy, IPS policy etc., to apply to the flow) as well as other information that is used by the other modules in the multi-mode switch 106 such as encryption parameters, address translation parameters, bookkeeping information, and statistics. The flow information can also include information required by the session engine 220 in order to decide whether the packet should be allowed. Such information can include information required to implement network policies regarding, for example connection time out, time billing, and bandwidth usage.

Policy processing engine 230 operates to apply a policy to a given packet based, for example on information returned by the zone processing block 210 and session engine 220. Policy processing engine 230 has an associated rule set 231 that includes policy information.

Rule set 231 can include policy information (firewall policy, IPS policy etc., to apply to the classified packets) as well as other information that is used by the other modules in the security device 106 such as encryption parameters, address translation parameters, bookkeeping information, and statistics. The rule set 231 can also include information required by the multi-mode switch 106 in order to decide whether the packet should be allowed. Such information can include information required to implement network policies regarding, for example connection time out, time billing, and bandwidth usage. Though rule set 231 and flow table 222 are shown as components of processing engine 60, they can be located remotely (e.g., included in memory 62).

Figure 3:
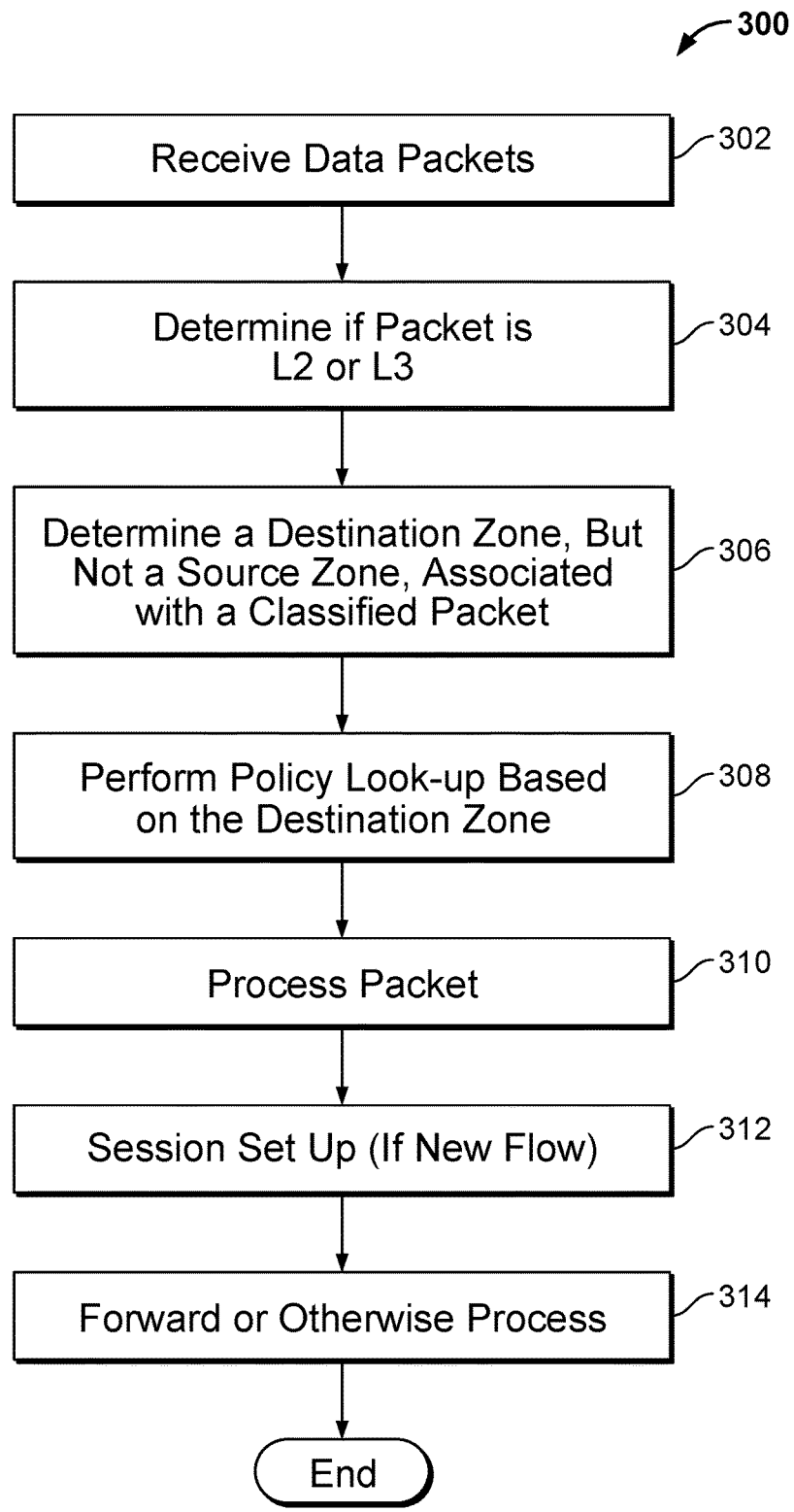
FIG. 3 shows a flow diagram describing the operation of the multi-mode switch.

FIG. 3 is a flow diagram describing the operation 300 of the multi-mode switch 106. Referring now to FIGS. 2a and 2b, incoming packets are received by, for example the packet interface 205 (step 302). Packets can be initially processed (e.g., de-fragmented and headers validated) as required. An initial determination is made as to whether the received packet is a layer 2 or layer 3 packet, e.g., by processing engine 60 (step 304). At least one zone associated with the packet is determined (step 306). In one implementation, the destination zone associated with the packet is determined. Alternatively, both source and destination zones can be determined (e.g., by zone processing block 210). A policy look-up is performed to locate (e.g., in rules set 231) one or more policies associated with the packet based on the zone information (step 308). The policy look-up can be performed by the policy processing engine 230.

Packet processing in accordance with the policy can be performed (step 310). Packet processing can include the application of a policy determined in the look-up step. A session can be established for the packet flow (step 312). Finally, the packet can be forwarded or otherwise processed based on the policy processing outcome (step 314). Other processing can include logging particular information regarding the packet, holding the packet, modifying the packet, dropping the packet or banning the entire flow.

In one particular implementation, in addition to zone based classification, the packets are classified in accordance with both content and header information, by for example a multi-mode classification engine. Based on the classification, specialized processing can be performed including one or more of content-based protocol decoding, content based object extraction and content based pattern matching. A determination can be made if the packet should be allowed based on information obtained regarding the header (including flow information developed for example in session engine 220), the content or the specialized processing. Packet classification is described in greater detail in co-pending and commonly owned U.S. patent application Ser. No. 11/475,393, entitled "PACKET CLASSIFICATION IN A NETWORK SECURITY DEVICE", filed Jun. 26, 2006, the contents of which are expressly incorporated herein by reference.

The multi-mode switch 106 can be used in a number of different network topologies. The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

This invention has been described in terms of particular embodiments. Nevertheless, it will be understood that various modifications may be made without departing with the spirit and scope of the invention. For instance, the steps of the invention can be performed in a different order and still achieve desirable results. Accordingly, other embodiments are within the scope of the following claims.

What is claimed is:

1. A method for forwarding data packets in a computer network, the method comprising:
   receiving a data packet;
   examining the data packet using a processor to classify the data packet including classifying the data packet as a layer 2 (L2) or layer 3 (L3) packet;
   determining a destination zone, but not a source zone, associated with the classified data packet, wherein the destination zone is associated with at least one policy rule, and wherein a policy includes one or more policy rules that are indexed by the destination zone;
   performing a policy look-up based on the destination zone to determine one or more policies;
   processing the classified data packet in accordance with the one or more determined policies including:
      performing content based pattern matching on the classified data packet;
      setting up a session if the classified data packet is associated with a new flow; and
      forwarding or performing other processing on the classified data packet to an intended destination if the determined policies permit based on the destination zone and content based pattern matching, wherein the other processing on the classified data packet includes logging information about the classified data packet, holding the classified data packet, setting an alarm, dropping the classified data packet, modifying the classified data packet, dropping or banning an entire flow associated with the classified data packet, or any combination thereof.

2. The method of claim 1, wherein processing the classified data packet includes processing the classified data packet in accordance with header data.

3. The method of claim 1, wherein processing the classified data packet includes processing the classified data packet based on the content.

4. The method of claim 1, wherein processing the classified data packet includes performing content based protocol decoding on the classified data packet.

5. The method of claim 1, wherein processing the classified data packet includes performing content based object extraction on the classified data packet.

6. The method of claim 1, wherein processing the classified data packet includes performing one or more of content based protocol decoding on the classified data packet, content based object extraction on the classified data packet, and content based pattern matching.

7. The method of claim 1, wherein determining the one or more policies based on the destination zone includes determining the one or more policies based on the destination zone without regard for the source zone.

8. The method of claim 1, wherein processing the classified data packet includes performing content based pattern matching on the classified data packet in accordance with both content and header data.

9. The method of claim 1, wherein processing the classified data packet includes performing content based pattern matching on the classified data packet in accordance with both content and header data including determining one or more content based policies associated with matched packets.

10. The method of claim 1, wherein the content based pattern matching on the classified data packet is performed in accordance with signature data including determining one or more content based policies associated with matched packets.

11. A system for forwarding data packets in a computer network, the method comprising:
   a processor configured to:
      receive a data packet;
      examine the data packet using a processor to classify the data packet including classifying the data packet as a layer 2 (L2) or layer 3 (L3) packet;
      determine a destination zone, but not a source zone, associated with the classified data packet, wherein the destination zone is associated with at least one policy rule, and wherein a policy includes one or more policy rules that are indexed by the destination zone;
      perform a policy look-up based on the destination zone to determine one or more policies;
      process the classified data packet in accordance with the one or more determined policies including:
         perform content based pattern matching on the classified data packet;
         set up a session if the classified data packet is associated with a new flow; and
         forward or perform other processing on the classified data packet to an intended destination if the determined policies permit based on the destination zone and content based pattern matching, wherein the other processing on the classified data packet includes log information about the classified data packet, hold the classified data packet, set an alarm, drop the classified data packet, modify the classified data packet, dropping or ban an entire flow associated with the classified data packet, or any combination thereof; and
   a memory coupled to the processor and configured to provide the processor with instructions.

12. The system recited in claim 11, wherein process the classified data packet includes process the classified data packet in accordance with header data.

13. The system recited in claim 11, wherein process the classified data packet includes process the classified data packet based on the content.

14. The system recited in claim 11, wherein process the classified data packet includes perform content based protocol decoding on the classified data packet.

15. The system recited in claim 11, wherein process the classified data packet includes perform content based object extraction on the classified data packet.

16. The system recited in claim 11, wherein process the classified data packet includes perform one or more of content based protocol decoding on the classified data packet, content based object extraction on the classified data packet, and content based pattern matching.

17. The system recited in claim 11, wherein determine the one or more policies based on the destination zone includes determine the one or more policies based on the destination zone without regard for the source zone.

18. The system recited in claim 11, wherein process the classified data packet includes perform content based pattern matching on the classified data packet in accordance with both content and header data.

19. The system recited in claim 11, wherein process the classified data packet includes perform content based pattern matching on the classified data packet in accordance with both content and header data including determining one or more content based policies associated with matched packets.

20. The system recited in claim 11, wherein the content based pattern matching on the classified data packet is performed in accordance with signature data including determining one or more content based policies associated with matched packets.

* * * * *